(12) United States Patent
Takao et al.

(10) Patent No.: US 6,900,253 B2
(45) Date of Patent: May 31, 2005

(54) INK FOR INK JET PRINTER

(75) Inventors: Nagayuki Takao, Ryugasaki (JP); Miyuki Nishimura, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/820,313

(22) Filed: Mar. 29, 2001

(65) Prior Publication Data
US 2002/0077383 A1 Jun. 20, 2002

(30) Foreign Application Priority Data
Mar. 29, 2000 (JP) .......................... 2000-090812

(51) Int. Cl.⁷ ................. C09D 11/10; C08L 51/00; C08L 51/08
(52) U.S. Cl. ...................... 523/160; 524/504
(58) Field of Search ................ 523/160, 161; 106/31.6, 31.85; 524/504, 588, 556

(56) References Cited

U.S. PATENT DOCUMENTS

| | | | | |
|---|---|---|---|---|
| 4,673,718 A | * | 6/1987 | Ryntz et al. | 525/476 |
| 5,656,071 A | * | 8/1997 | Kappele et al. | 106/31.76 |
| 5,854,308 A | * | 12/1998 | Kuo et al. | 523/161 |
| 5,936,027 A | * | 8/1999 | Zahrobsky et al. | 524/506 |
| 5,952,048 A | * | 9/1999 | Tsubuko et al. | 427/288 |
| 5,952,429 A | * | 9/1999 | Ikeda et al. | 525/326.1 |
| 6,225,370 B1 | * | 5/2001 | Suthar et al. | 523/160 |
| 2003/0212198 A1 | | 11/2003 | Takao et al. | 524/588 |

FOREIGN PATENT DOCUMENTS

| | | |
|---|---|---|
| JP | 3033172 | 2/1991 |
| JP | 4248879 | 9/1992 |
| JP | 0525417 | 2/1993 |
| JP | 10330684 | * 12/1998 |

OTHER PUBLICATIONS

Machine Translation of JP 10330684 (1998).*

* cited by examiner

Primary Examiner—Callie Shosho
(74) Attorney, Agent, or Firm—Birch, Stewart, Kolasch & Birch, LLP

(57) ABSTRACT

The object of the present invention is to provide an ink for ink jet printers which is improved in dispersion stability. The ink is one containing a pigment and an organic solvent where a silicone graft polymer is contained in the ink and is dispersed in the organic solvent in the form of particles having a particle diameter of 0.01–0.3 μm in such a state as the silicone graft polymer being adsorbed to at least a part of the outer surface of the pigment. The pigment is an organic pigment and/or carbon black.

14 Claims, 2 Drawing Sheets

INK FOR INK JET PRINTER

BACKGROUND OF THE INVENTION

The present invention relates to an ink for ink jet printers which comprises an organic solvent and a pigment dispersed in the organic solvent. More particularly, it relates to an ink for ink jet printers which is improved in dispersion stability of the pigment.

Hitherto, in the field of inks for ink jet printers which comprise an organic solvent and a pigment dispersed therein, the pigment is dispersed using a dispersing agent, and various improvements of printing characteristics and storage stability have been attempted. For example, JP-A-04-161467 and JP-A-04-248879 disclose inks which comprise a silicone-based organic solvent containing a pigment, a resin and a dispersing agent and show attainment of excellent print quality by giving rapid drying characteristics to the inks.

Furthermore, JP-A-05-25417 discloses that an ink jet ink comprising colored resin particles dispersed in a non-polar insulating organic solvent shows no blotting on a recording paper, is excellent in print drying characteristics, causes no clogging of nozzles, and is excellent in scuff resistance.

However, when the silicone-based organic solvent is used, there are no suitable dispersing agents capable of finely dispersing the pigment, and the dispersion particle size of the pigment is large, namely, 0.5–5 $\mu$m. Therefore, if the ink is stored for a long period of time, the particles sediment to cause deterioration in print quality. Moreover, in the case of using the colored resin particles, the colored resin particles are ground and dispersed, and, hence, the dispersion particle size is great and the particles sediment to cause deterioration in print quality. In addition, since hydrocarbon solvents are used as the organic solvents, there is a fear in safety for human bodies.

Further, aqueous ink jet inks of pigment type which are generally sold are not satisfactory in water resistance.

SUMMARY OF THE INVENTION

Accordingly, the object of the present invention is to provide an ink for ink jet printers which comprises a stable dispersion of fine particles of a pigment in an organic solvent, does not sediment even if it is stored for a long period of time and, thus, is excellent in print stability, is excellent in water resistance and light fastness, causes no deterioration in print quality, and, further, is excellent in safety for human bodies.

The above object can be attained by providing an ink for ink jet printers containing a pigment and an organic solvent which is prepared by dispersing the pigment in the form of particles having a particle diameter of 0.01–0.3 $\mu$m in the organic solvent in such a state that a silicone graft polymer is adsorbed to at least a part of the outer surface of the pigment.

According to the investigation conducted by the inventors, it has been found that when a pigment in the form of particles having a particle diameter of 0.01–0.3 $\mu$m is dispersed in an organic solvent in such a state that a silicone graft polymer is adsorbed to the surface of the pigment, steric repulsive force between pigment particles per se is enhanced to prevent sedimentation of the pigment, and, besides, dispersion stability can be increased and print stability can be improved, and, furthermore, print quality can be improved by the use of the pigment and the organic solvent.

DETAILED DESCRIPTION OF THE INVENTION

Figure 1:
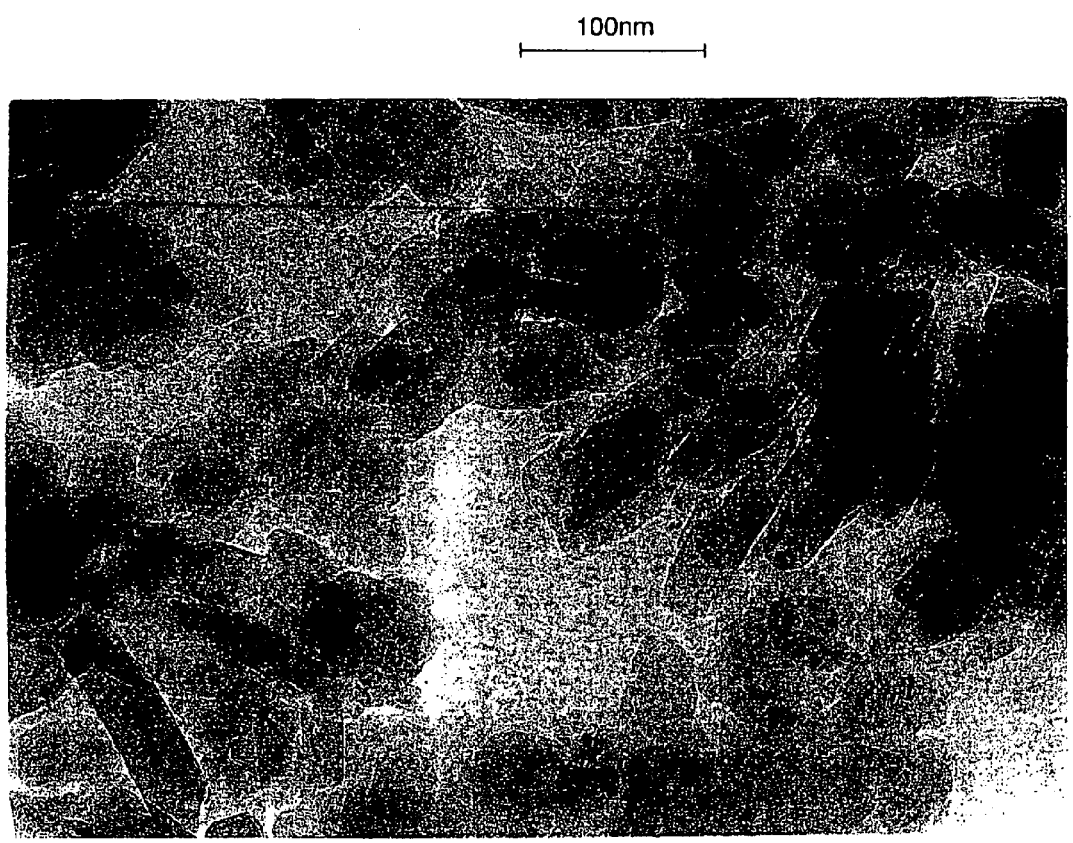
FIG. 1 is an electron microphotograph of the organic pigment before adsorption of the polymer contained in the dispersion composition in Example 1.

The ink for ink jet printers according to the present invention basically contains a pigment, an organic solvent and a silicone graft polymer as essential components.

The silicone graft polymer is a graft polymer having silicone, and is not especially limited as far as it is adsorbed to the surface of a pigment and disperses the pigment in the form of particles of 0.01–0.3 $\mu$m in an organic solvent, but the polymer is more preferably one which is self-dispersed in a particle diameter of 0.01–0.3 $\mu$m, preferably 0.015–0.2 $\mu$m. More preferred particle diameter is 0.015–0.1 $\mu$m.

In this specification, the term "self-disperse" means that the graft polymer is not dissolved in an organic solvent and the graft polymer is dispersed by itself without using a protective colloid protecting a special dispersion or a surface active agent. For example, mention may be made of a phenomenon that when the graft polymer is dissolved in an organic solvent which dissolves the graft polymer and, then, this solution is mixed with an organic solvent which does not dissolve the graft polymer, the graft polymer disperses in the form of particles without forming large agglomerates. The particle diameter of the graft polymer can be measured by generally known particle size distribution measuring apparatuses such as laser type or light scattering type particle size distribution meters and centrifugal sedimentation type particle size distribution meters.

Particle diameter of the pigment to which the silicone graft polymer is adsorbed in the ink for ink jet printers according to the present invention is preferably 0.01–0.3 $\mu$m, more preferably 0.01–0.2 $\mu$m, taking into consideration deterioration of print quality. More preferred range is 0.01–0.1 $\mu$m, 0.05–0.25 $\mu$m, 0.1–0.3 $\mu$m, or 0.08–0.16 $\mu$m.

Particle size distribution of primary particle diameter of the pigment in the ink of the present invention is preferably 0.01–0.29 $\mu$m, and more preferably 0.01–0.2 $\mu$m from the point of inhibition of sedimentation of the pigment. The particle size distribution of the pigment can be controlled within the range of 0.01–0.3 $\mu$m by, for example, a method of dry grinding a crude pigment together with a grinding medium such as balls in a ball mill, a method of attrition of a crude pigment together with ethylene glycol and a salt in a kneader, a method of wet grinding a crude pigment together with a grinding medium such as balls in a solvent, a method of dissolving a crude pigment in a specific solvent and then precipitating the pigment (such as a method of dissolving the pigment in sulfuric acid and then precipitating the pigment by adding water or adding the solution to water), and the like.

The pigment to which a silicone graft polymer is adsorbed in the ink of the present invention preferably has an electric charge from the point of dispersion stability. For example, as the electric charge of the pigment, an absolute value of $\zeta$ potential is preferably 10–300 mV, more preferably 15–200 mV.

Examples of the pigments usable in the ink for ink jet printers of the present invention are inorganic pigments, organic pigments and dyes which do not dissolve in solvents. These pigments can be used each alone or in admixture of two or more.

As the inorganic pigments, mention may be made of, for example, carbon black, titanium oxide, zinc white, zinc oxide, tripone, iron oxide, aluminum oxide, silicon dioxide, kaolinite, montmorillonite, talc, barium sulfate, calcium carbonate, silica, alumina, cadmium red, red iron oxide, molybdenum red, chrome vermilion, molybdate orange, chrome yellow, chrome yellow, cadmium yellow, yellow iron oxide, titanium yellow, chromium oxide, viridian, cobalt green, titanium cobalt green, cobalt chrome green, ultramarine, ultramarine blue, prussian blue, cobalt blue, cerulean blue, manganese violet, cobalt violet, and mica. Carbon black is especially preferred.

As the organic pigments, mention may be made of, for example, quinacridone pigments such as C.I. Pigment Red 122, C.I. Pigment Red 202, C.I. Pigment Red 207, C.I. Pigment Red 209, and C.I. Pigment Violet 19; quinqcridone-quinone pigments such as C.I. Pigment Orange 48 and C.I. Pigment Orange 49; dioxazine pigments such as C.I. Pigment Violet 23 and C.I. Pigment Violet 37; phthalocyanine pigments such as C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment Blue 68, C.I. Pigment Green 7, and C.I. Pigment Green 36; anthrapyrimidine pigments such as C.I. Pigment Yellow 108; anthanthrone pigments such as C.I. Pigment Orange 77 and C.I. Pigment Red 168; indanthrone pigments such as C.I. Pigment Blue 60; flavanthrone pigments such as C.I. Pigment Yellow 24, anthraquinone pigments such as C.I. Pigment Yellow 196 and C.I. Pigment Red 177; perylene pigments such as C.I. Pigment Red 123, C.I. Pigment Red 149, C.I. Pigment Red 178, C.I. Pigment Red 179, C.I. Pigment Red 190 and C.I. Pigment Red 224; perynone pigments such as C.I. pigment Yellow 196 and C.I. Pigment Orange 43; quinophthalone pigments such as C.I. Pigment Yellow 138; diketopyrrolopyrrole pigments such as C.I. Pigment Orange 71, C.I. Pigment Orange 73, C.I. Pigment Red 254, C.I. Pigment Red 255, C.I. Pigment Red 264 and C.I. Pigment Red 272; thioindigo pigments such as C.I. Pigment Red 88, C.I. Pigment Red 181 and C.I. Pigment Brown 27; isoindoline pigments such as C.I. Pigment Yellow 139, C.I. Pigment Yellow 185, C.I. Pigment Orange 69 and C.I. Pigment Red 260; isoindolinone pigments such as C.I. Pigment Yellow 109, C.I. Pigment Yellow 110 and C.I. Pigment yellow 173; azomethine pigments such as C.I. Pigment Yellow 101, C.I. Pigment Yellow 129 and C.I. Pigment Orange 65; benzimidazolone pigments such as C.I. Pigment Yellow 151, C.I. Pigment Yellow 154, C.I. Pigment Yellow 175, C.I. Pigment Yellow 180, C.I. Pigment Yellow 181, C.I. Pigment Orange 36, C.I. Pigment Red 175, C.I. Pigment red 176 and C.I. Pigment Red 185; monoazo pigments such as C.I. Pigment Yellow 1, C.I. Pigment Yellow 65, C.I. Pigment Yellow 73, C.I. Pigment Yellow 74, C.I. Pigment Yellow 116, C.I. Pigment Red 3, C.I. Pigment 48:1, C.I. Pigment Red 48:2, C.I. Pigment Red 48:3, C.I. Pigment Red 53:1, C.I. Pigment Red 57:1 and C.I. Pigment Red 115; disazo pigments such as C.I. Pigment Yellow 12, C.I. Pigment Yellow 13, C.I. Pigment Yellow 17, C.I. Pigment Yellow 81, C.I. pigment Yellow 83, C.I. Pigment Orange 13 and C.I. pigment Orange 16; condensed azo pigments such as C.I. pigment Yellow 93, C.I. Pigment Yellow 95, C.I. Pigment Yellow 128, C.I. Pigment Red 144, C.I. Pigment Red 166, C.I. Pigment Red 220 and C.I. Pigment Red 221; and the like. The pigments may be dry pigments in the form of powder, granule or bulk, or may be in the form of wet cake or slurry.

The dyes which do not dissolve in solvents are preferably those of azo type, anthraquinone type, indigo type, phthalocyanine type, carbonyl type, quinoneimine type, methine type, quinoline type, and nitro type, and, among them, disperse dyes are particularly preferred.

In the ink for ink jet printers of the present invention, it is especially preferred to use organic pigments and/or carbon black as the pigments.

Amount of the silicone graft polymer for the pigment (for example, an organic pigment and/or carbon black) in the ink for ink jet printers of the present invention is preferably in the range of 5–3000 parts by weight based on 100 parts by weight of the pigment. Furthermore, it is more preferred that amount of the silicone graft polymer adsorbed to the pigment is in the range of 20–1000 parts by weight based on 100 parts by weight of the pigment. When the amount of the silicone graft polymer is not less than 5 parts by weight, dispersion stability is satisfactory and when it is not more than 3000 parts by weight, since content of the pigment in the dispersion composition does not decrease, a pigment concentration sufficient for utilization for inks can be obtained. More preferred amount of the silicone graft polymer for the pigment in the ink for ink jet printers according to the present invention is 30–1000 parts by weight based on 100 parts by weight of the pigment.

The accurate mechanism of adsorption of the silicone graft polymer to the pigment (for example, an organic pigment and/or carbon black) is not clear, but it is considered that the silicone graft polymer is adsorbed to the surface of the pigment by one of or suitable combination of chemical bonding (for example, acid-base bonding such as bonding between a basic site on the surface of the pigment formed by deviation of electrons and an acidic site of the silicone graft polymer or between a tertiary amino group introduced into the surface of the pigment and a carboxyl group introduced into the silicone graft polymer, ionic bonding due to salt formation of a divalent or higher valent metal ion with the silicone graft polymer, or covalent bonding due to polymerization based on the active groups on the surface of the pigment), physical adsorption (for example, adsorption caused by flocculation force produced as a result of flocculation of the silicone graft polymer which has become insoluble in a solvent, mechanical adsorption caused by dispersing the pigment and the silicone graft polymer by a dispersing machine) and physicochemical adsorption (for example, by dispersing the silicone graft polymer and the pigment and reacting the active group on the surface of the pigment and the silicone graft polymer under adsorbing the silicone graft polymer to the surface of the pigment).

Adsorption amount of the silicone graft polymer to the pigment can be obtained by conventional methods. For example, it can be indirectly measured by adjusting the nonvolatile matter concentration in the ink to 5%, then subjecting the ink to centrifugal separation until the supernatant liquid becomes transparent, and measuring the concentration of the silicone graft polymer in the supernatant liquid.

The organic solvents usable in the ink for ink jet printers of the present invention are preferably those which are small in polarity and have an electrical resistivity of not lower than $10^9$ $\Omega \cdot cm$. The upper limit of the electrical resistivity is generally about $10^{18}$ $\Omega \cdot cm$. The organic solvents suitable for the above purpose include, for example, aliphatic hydrocarbon solvents such as hexane and mineral spirit; silicone-based organic solvents such as dialkylpolysiloxanes and cyclic polydialkylsiloxanes; vegetable oils such as olive oil, safflower oil, sunflower oil, soybean oil and linseed oil; aromatic hydrocarbon solvents such as benzene, toluene and xylene; ester solvents such as butyl acetate; alcohol solvents such as methanol and butanol; ketone solvents such as methyl ethyl ketone and isobutyl methyl ketone; and non-protonic polar solvents such as dimethylformamide, dimethyl sulfoxide, N-methylpyrrolidone and pyridine. These solvents may be used each alone or in admixture of two or more. Of these solvents, silicone-based organic solvents are preferred considering influence on human bodies, and methylpolysiloxanes and cyclic methylpolysiloxanes are more preferred. Taking into consideration the safety such as flammability, silicone-based organic solvents having a boiling point of 200° C. or higher are preferred.

The proportion of the organic solvent in the ink for ink jet printers of the present invention is preferably 50–10000 parts by weight, more preferably 100–3000 parts by weight based on 100 parts by weight of the pigment. If the proportion of the organic solvent is less than 50 parts by weight based on 100 parts by weight of the pigment, viscosity is too high and printing becomes impossible. If it is more than 10000 parts by weight based on 100 parts by weight of the pigment, the print is too light in color and this is not preferred.

The silicone graft polymer preferably has a polar group for finely dispersing the pigment and improving the dispersion stability of the pigment. The polar groups suitable for such purpose are not limited and include basic groups, acidic groups, hydroxyl group, and the like. Especially, acidic group and hydroxyl group are preferred for finely dispersing the pigment and for performing crosslinking reaction. As basic groups, there are no special limitations, and mention may be made of, for example, primary, secondary, tertiary and quaternary amino groups, and the like. As acidic groups, there are no special limitations, and mention may be made of carboxyl group, sulfonic acid group, phosphonic acid group, and the like. Carboxyl group of low acid strength is especially preferred since agglomeration of the dispersion composition hardly occurs and from the point of reaction rate of the crosslinking reaction.

Acid value of the silicone graft polymer is preferably in the range of 5–100 KOH mg/g. When the acid value is not less than 5 KOH mg/g, affinity with the pigment is strong, a fine dispersion ink for ink jet printers can be obtained and dispersion stability is improved. When the acid value is not more than 100 KOH mg/g, increase of acid strength of the silicone graft polymer is inhibited, self-dispersion readily occurs, and gelation at the time of preparation can be inhibited to attain easy preparation.

Hydroxyl value of the silicone graft polymer is preferably in the range of 5–100 KOH mg/g. When the hydroxyl value is not less than 5 KOH mg/g, affinity with the pigment is strong, a fine dispersion ink for ink jet printers can be obtained and dispersion stability is improved. Furthermore, when the hydroxyl value is not more than 100 KOH mg/g, increase of acid strength of the silicone graft polymer is inhibited, self-dispersion readily occurs, and gelation at the time of preparation can be inhibited to attain easy preparation.

Amine value of the silicone graft polymer is preferably in the range of 5–100 KOH mg/g. When the amine value is not less than 5 KOH mg/g, affinity with the pigment is strong, a fine dispersion ink for ink jet printers can be obtained and dispersion stability is improved. Furthermore, when the amine value is not more than 100 KOH mg/g, increase of acid strength of the silicone graft polymer is inhibited, self-dispersion readily occurs, and gelation at the time of preparation can be inhibited to attain easy preparation.

Number-average molecular weight of the silicone graft polymer is preferably in the range of 2000–50000. When the number-average molecular weight is not less than 2000, the pigment can be finely dispersed, and sedimentation of the pigment can be inhibited. When the molecular weight is not more than 50000, the polymer easily dissolves in the solvent and too much increase of viscosity of the ink for ink jet printers can be inhibited. More preferred range is 3000–30000.

As the kinds of the silicone graft polymer, mention may be made of acrylic, polyester, polyurethane, epoxy and amino type high molecular compounds as preferred materials. These high molecular compounds may be used each alone or in admixture of two or more. Among them, acrylic high molecular compounds are more preferred from the points of easy preparation or grafting and easy introduction of polar group.

Considering easiness of self-dispersion in organic solvents, grafted acrylic high molecular compounds are especially preferred. This is because the portion which is adsorbed to the pigment and the portion which develops an affinity for the organic solvent are branched on the branch to make easy the occurrence of self-dispersion. That is, since the end of the-backbone of the graft is not solvated, self-dispersion becomes easy. Moreover, amphoteric high molecular compounds having both the acidic group and the basic group are also preferred.

As the grafted acrylic high molecular compounds, preferred are those which have a molecular weight of the graft portion of 500–10000, and more preferred are those which have the molecular weight of the graft portion of 1000–8000.

The graft portion is preferably silicone because of high affinity for the solvent.

The method for preparation of the silicone graft polymer comprises, for example, reacting a monomer having polar group, a macro-monomer and a monomer having silicone in a non-reactive solvent in the presence or absence of a catalyst. Especially preferred method comprises polymerizing a monomer having polar group and a silicone-based macro-monomer as essential components. Another preferred method comprises preparing an acrylic high molecular compound having a reactive group and then reacting the compound with a reactive silicone to perform grafting. The silicone graft polymer is preferably one which does not become massive after polymerization and dissolves or disperses in fine particle state, and a particle diameter of 0.01–0.3 µm is especially preferred.

Among the polar group-containing acrylic monomers used in the present invention, examples of the preferred monomers having an acidic group as the polar group are monomers having carboxyl group such as acrylic acid, methacrylic acid, crotonic acid, ethacrylic acid, propylacrylic acid, isopropylacrylic acid, itaconic acid, fumaric acid, acryloyloxyethyl phthalate and acryloyloxy succinate; monomers having sulfonic acid group such as acrylic acid ethyl 2-sulfonate, methacrylic acid ethyl 2-sulfonate and butylacrylamidosulfonic acid; monomers having phosphonic acid group such as methacrylic acid ethyl 2-phosphonate and acrylic acid ethyl 2-phosphonate; and monomers having hydroxyl group such as 2-hydroxyethyl acrylate, 2-hydroxyethyl methacrylate, hydroxypropyl acrylate and hydroxypropyl methacrylate. Among them, more preferred are monomers having carboxyl group or hydroxyl group.

Examples of monomers having basic group are monomers having primary amino group such as acrylic acid amide, aminoethyl acrylate, aminopropyl acrylate, methacrylic acid amide, aminoethyl methacrylate and aminopropyl methacrylate; monomers having secondary amino group such as methylaminoethyl acrylate, methylaminopropyl acrylate, ethylaminoethyl acrylate, ethylaminopropyl acrylate, methylaminoethyl methacrylate, methylaminopropyl methacrylate, ethylaminoethyl methacrylate and ethylaminopropyl methacrylate; monomers having tertiary amino group such as dimethylaminoethyl acrylate, diethylaminoethyl acrylate, dimethylaminopropyl acrylate, diethylaminopropyl acrylate, dimethylaminoethyl methacrylate, diethylaminoethyl methacrylate, dimethylaminopropyl methacrylate and diethylaminopropyl methacrylate; and monomers having quaternary amino group such as acrylic acid dimethylaminoethylmethyl chloride, methacrylic acid dimethylaminoethylmethyl chloride, acrylic acid dimethylaminoethylbenzyl chloride and methacrylic acid dimethylaminoethylbenzyl chloride.

As the silicone-based macro-monomers into which a graft portion is introduced, especially preferred are those of polyether type which are obtained by subjecting a hydroxyalkylene monomethacrylate to addition reaction with siloxane oxide using a cationic catalyst, those of ester type which are obtained by polyesterifying a polybasic acid and a hydroxyl group-containing silicone and then esterifying the polyester with glycidyl methacrylate, and those which are obtained by methoxylating waterglass as a starting material and then introducing a methacrylate at the end thereof.

As the above silicone-based macro-monomers, especially preferred are macromers in which dimethylsiloxane is bonded directly to methacryloyl group or bonded to methacryloyl group through an alkyl group, and examples thereof are X-22-174DX (manufactured by Shin-Etsu Chemical Co., Ltd.) and AK-5, AK-30, AK-32 (manufactured by Toagosei Chemical Industry Co., Ltd.).

As the other preferable polymerizable monomers, mention may be made of, for example, (meth)acrylic acid esters such as methyl acrylate, ethyl acrylate, isopropyl acrylate, n-propyl acrylate, n-butyl acrylate, t-butyl acrylate, benzyl acrylate, methyl methacrylate, ethyl methacrylate, isopropyl methacrylate, n-propyl methacrylate, n-butyl methacrylate, isobutyl methacrylate, t-butyl methacrylate, tridecyl methacrylate, benzyl methacrylate, 2-ethylhexyl acrylate, 2-ethylhexyl methacrylate, octyl acrylate, octyl methacrylate, lauryl acrylate, lauryl methacrylate, cetyl acrylate, cetyl methacrylate, stearyl acrylate, stearyl methacrylate, behenyl acrylate and behenyl methacrylate; styrene monomers such as styrene, α-methylstyrene, o-methylstyrene, m-methylstyrene, p-methylstyrene and p-tert-butylstyrene; itaconic acid esters such as benzyl itaconate; maleic acid esters such as dimethyl maleate; fumaric acid esters such as dimethyl fumarate; acrylonitrile, methacrylonitrile, vinyl acetate; hydroxyl group-containing monomers such as 2-hydroxyethyl acrylate, 2-hydroxyethyl methacrylate, hydroxypropyl acrylate and hydroxypropyl methacrylate; amino group-containing monomers such as aminoethyl ethylacrylate, aminopropyl acrylate, methacrylic acid amide, aminoethyl methacrylate, aminopropyl methacrylate, dimethylaminoethyl acrylate and dimethylaminoethyl methacrylate; and α-olefins such as ethylene.

As the catalysts, preferred are peroxides such as t-butylperoxy benzoate, di-t-butyl peroxide, cumene perhydroxide, acetyl peroxide, benzoyl peroxide and lauroyl peroxide; and azo compounds such as azobisisobutyronitrile, azobis-2,4-dimethylvaleronitrile and azobiscyclohexanecarbonitrile.

As the non-reactive solvents, preferred are aliphatic hydrocarbon solvents such as hexane and mineral spirit; aromatic hydrocarbon solvents such as benzene, toluene and xylene; ester solvents such as butyl acetate; alcohol solvents such as methanol and butanol; ketone solvents such as methyl ethyl ketone and isobutyl methyl ketone; and non-protonic polar solvents such as dimethylformamide, dimethyl sulfoxide, N-methylpyrrolidone and pyridine. These solvents may be used in combination.

The reaction processes include generally known processes such as bulk polymerization, solution polymerization, suspension polymerization, emulsion polymerization and redox polymerization. Of these processes, solution polymerization is preferred because this reaction process is simple.

The reaction conditions vary depending on the polymerization initiators and solvents used, but the reaction temperature is not higher than 180° C., preferably 30–150° C., and the reaction time is from 30 minutes to 40 hours, preferably from 2 hours to 30 hours.

As mentioned above, according to the present invention, the silicone graft polymer is adsorbed to the pigment, whereby the pigment is dispersion stabilized to prevent sedimentation. From the point of dispersion stability for various solvents, when the silicone graft polymer is crosslinked and is adsorbed to the particle material, the dispersion stability can be further improved.

The crosslinkage is preferably ester linkage, amino linkage, urethane linkage, ether linkage and C—C linkage formed by radical reaction. The ester linkage is especially preferred from the points of reaction rate, reaction time and stability at dispersion of the particulate material.

Methods for crosslinking the silicone graft polymer which is self-dispersed include a method of using crosslinking agents and a method of introducing a functional group for crosslinking into the high molecular compound which is self-dispersed.

The crosslinking agents are preferably those which react with the polar group in the silicone graft polymer, and examples thereof are amino resins such as melamine resins, benzoguanamine resins and urea resins; isocyanate resins such as tolylene diisocyanate prepolymers, polyfunctional aromatic polyisocyanates, diphenylmethane diisocyanate, hexamethylene diisocyanate prepolymers, xylylene isocyanate prepolymers and lysine isocyanate prepolymers; epoxy resins such as bisphenol A and acrylic resins having glycidyl group; and chelate compounds of Ti, Al, Zr or the like. Among them, amino resins and epoxy resins are especially preferred from the points of reaction rate and reaction temperature. Since the acrylic high molecular compounds have only one kind of functional group, crosslinking agents are sometimes needed.

The functional groups for crosslinking introduced into the silicone graft polymer are preferably amino group, hydroxyl group, methoxy group, and glycidyl group. Among them, hydroxyl group and glycidyl group are especially preferred from the points of reaction rate and reaction temperature.

As the method for introducing the functional group for crosslinking, preferred are a method of carrying out polymerization or condensation using a monomer having functional group for crosslinking, a polyhydric alcohol and hydroxylamine or polyamine at the time of preparation of the high molecular compound having acidic group and a method of introducing the crosslinking functional group by polymerization, condensation or addition reaction after preparation of a prepolymer of the high molecular compound having acidic group. It is needless to say that after the introduction of the functional group for crosslinking, the high molecular compound is self-dispersed.

Examples of the monomers having the functional group for crosslinking used in preparation of the silicone graft polymer are hydroxyl group-containing monomers such as 2-hydroxyethyl acrylate, 2-hydroxyethyl methacrylate, hydroxypropyl acrylate, hydroxypropyl methacrylate, glycerol monomethacrylate, polyethylene glycol monomethacrylate, propylene glycol monomethacrylate, polyethylene glycol monoacrylate and propylene glycol monoacrylate; glycidyl group-containing monomers such as glycidyl acrylate and glycidyl methacrylate; methoxy group-containing monomers such as methoxypolyethylene glycol acrylate and methoxypolyethylene glycol methacrylate; and amino group-containing monomers such as acrylamide and methacrylamide. Among them, glycidyl group-containing monomers are more preferred since hydroxyl group is produced after the reaction of the glycidyl group-containing monomers to improve the electric charge of the particulate material.

Furthermore, in the method of introducing the functional group for crosslinking by polymerization, condensation or addition reaction after preparation of the prepolymer of the silicone graft polymer, the compounds having the functional group for crosslinking for introduction by polymerization, condensation or addition reaction can be those which have two or more reactive groups, and these compounds are preferably polyhydric alcohols, polyamines, hydroxyamines, bisphenol A and polyisocyanates.

If necessary, surface active agents may be contained in the ink for ink jet printers of the resent invention in addition to the pigment, the organic solvent and the silicone graft polymer-as basic essential components.

The surface active agents are used for improving surface tension of the ink and wettability of the pigment, and inhibiting drying of the ink at the head and blotting of the ink on a paper. The surface active agents used in the ink for ink jet printers of the present invention include, for example, anionic surface active agents, cationic surface active agents, nonionic surface active agents and amphoteric surface active agents. Among them, especially preferred are anionic surface active agents and nonionic surface active agents.

As the anionic surface active agents, preferred are fatty acid salts such as sodium stearate soap, potassium oleate soap and partially hydrogenated beef tallow fatty acid sodium salt soap; alkylsulfuric acid salts such as sodium laurylsulfate, triethanolamine laurylsulfate and sodium salt of higher alcohol sulfuric acid; alkylbenzenesulfonic acid salts such as sodium dodecylbenzenesulfonate; alkylnaphthalenesulfonic acid salts such as sodium alkylnaphthalenesulfonate; alkylsulfosuccinic acid salts such as sodium dialkylsulfosuccinate; alkyldiphenyl ether disulfonic acid salts such as sodium alkyldiphenyl ether disulfonate; alkylphosphoric acid salts such as potassium alkylphosphate; polyoxyethylenealkylsulfuric acid esters such as sodium polyoxyethylenelauryl ether sulfates and triethanolamine polyoxyethylenealkylsulfate; alkylarylsulfuric acid ester salts such as sodium polyoxyethylenealkylphenyl ether sulfate; polyoxyethylenealkylphosphoric acid esters; and naphthalenesulfonic acid formaldehyde condensates.

As the cationic surface active agents, preferred are alkylamine salts such as coconut amine acetate and stearylamine acetate; quaternary ammonium salts such as lauryltrimethylammonium chloride, stearyltrimethylammonium chloride and alkylbenzyldimethylammonium chloride; alkylbetaines such as laurylbetaine and stearylbetaine; and amine oxides such as lauryldimethylamine oxide.

As the nonionic surface active agents, preferred are polyoxyethylenealkyl ethers such as polyoxyethylenelauryl ether, polyoxyethylenecetyl ether, polyoxyethylenestearyl ether, polyoxyethyleneoleyl ether and polyoxyethylene higer alcohol ether; polyoxyethylenealkylaryl ethers such as polyoxyethyleneoctylphenyl ether and polyoxyethylenenonylphenyl ether; polyoxyethylene derivatives; oxyethylene-oxypropylene block copolymer; sorbitan fatty acid esters; polyoxyethylene sorbitan fatty acid esters such as polyoxyethylene sorbitan monolaurate, polyoxyethylene sorbitan monopalmitate, polyoxyethylene sorbitan monostearate, polyoxyethylene sorbitan tristearate, polyoxyethylene sorbitan monooleate and polyoxyethylene sorbitan trioleate; polyoxyethylene sorbitol fatty acid esters such as polyoxyethylene sorbitol tetraoleate; and glycerin fatty acid esters.

Viscosity of the ink for ink jet printers of the present invention is preferably in the range of 1–20 mP·s. When the viscosity is not less than 1 mP·s, leakage of the ink from the cartridge can be inhibited, and when it is not more than 20 mP·s, the ink can be stably ejected. Furthermore, considering the high speed responsiveness, the viscosity is more preferably 2–15 mP·s.

The ink for ink jet printers according to the present invention can be prepared, for example, in the following manner. A dispersion obtained by dispersing, using a self-dispersing silicone graft polymer, a pigment (e.g., an organic pigment) in an organic solvent in which the silicone graft polymer is soluble is mixed with an organic solvent in which the silicone graft polymer is insoluble, thereby to precipitate the silicone graft polymer and adsorb it to the pigment, and, then, if necessary, solvent substitution, addition of various additives, adjustment of pigment concentration or filtration is carried out.

In more detail, the dispersion composition is prepared by a method which comprises a dispersing step A where the pigment (e.g., organic pigment) is dispersed using the silicone graft polymer in an organic solvent in which the silicone graft polymer is soluble, a mixing step B where an organic solvent in which the silicone graft polymer is insoluble is poured into the dispersion obtained in the dispersing step A or the dispersion obtained in the dispersing step A is poured into an organic solvent in which the silicone graft polymer is insoluble, followed by mixing to precipitate the silicone graft polymer and to adsorb the silicone graft polymer to the pigment, an optional crosslinking step C where the silicone graft polymer is fixed by crosslinking, and an optional concentrating step D where the solvent is distilled, and thereafter the resulting dispersion composition is subjected to addition of various additives, adjustment of pigment concentration, filtration or the like.

In the dispersing step A, the silicone graft polymer is dissolved in the organic solvent and the pigment is added thereto and the pigment is dispersed, if necessary, using a dispersing medium such as glass beads, steel beads or zirconia beads by a dispersing machine, e.g., beads mill such as dyno-mill or DSP mill, roll mill, sand mill, attritor, kneader or a high-pressure jetting mill such as nanomizer, thereby obtaining a dispersion. Furthermore, if necessary, to the dispersion, there may be added various additives such as surface active agents, pigment dispersing agents, pigment derivatives, and charge generators.

The conditions for dispersing the pigment by dispersing machines vary depending on the kind of the pigment or the kind of dispersing machines, but from economical viewpoint, the temperature is preferably 0–150° C., and the dispersing time is preferably as shorter as possible, but 0.1–10 hours/kg is preferred from the point of productivity. Dispersion particle diameter after being dispersed is preferably smaller than submicron, and more preferably not larger than 0.5 micron in terms of volumetric average diameter, considering inhibition of sedimentation and agglomeration.

The method for measurement of the dispersion particle diameter is not especially limited and the generally employed methods are utilized. For example, there may be used particle size distribution measurement apparatuses of laser scattering type or centrifugal settling type. Moreover, the crosslinking agent for crosslinking the silicone graft polymer is added before or after the dispersing. It is especially preferred to add it after the dispersing because there is no influence on the reaction and others at the time of dispersing. Amount of the crosslinking agent is not limited as far as the silicone graft polymer can be crosslinked and fixed on the pigment, but is preferably 2–100 parts by weight, more preferably 5–50 parts by weight based on 100 parts by weight of the silicone graft polymer.

In the next mixing step B, the organic solvent in which the silicone graft polymer is insoluble is slowly added to the dispersion prepared in the dispersing step A or the dispersion obtained in the dispersing step A is slowly added to the organic solvent in which the silicone graft polymer is insoluble, followed by mixing. In this case, at the time of addition or after addition, the dispersion is uniformly mixed using a simple stirrer such as three-one motor, magnetic stirrer, disper or homogenizer. Furthermore, the organic solvent in which the silicone graft polymer is insoluble and the dispersion prepared in the dispersing step A are mixed at one time using a mixing machine such as a line mixer. After the addition, a dispersing machine such as a beads mill or a high-pressure jetting mill may be employed for the purpose of making finer the precipitated particles.

The organic solvents in which the silicone graft polymer is insoluble are not especially limited as far as the silicone graft polymer does not dissolve therein, but those which have a solubility parameter of not more than 7.8 are especially preferred. Examples of the organic solvents having a solubility parameter of not more than 7.8 are aliphatic hydrocarbons such as hexane, mineral spirit and Isopar series hydrocarbons manufactured by Exone Chemical Co., Ltd., silicones such as dialkylpolysiloxanes and cyclic polydialkylsiloxanes, vegetable oils such as olive oil, safflower oil, sunflower oil, soybean oil and linseed oil, and diethyl ether. Amount of the organic solvent used here is preferably 0–10000 parts by weight based on 100 parts by weight of the silicone graft polymer for increasing the pigment concentration in the resulting dispersion composition.

In the crosslinking step C of fixing the silicone graft polymer by crosslinking, the crosslinking method is not especially limited, and examples of the crosslinking methods are heating and irradiation with ultraviolet rays or electron rays. The method of heating is particularly preferred from the point of reactivity or because the reaction can be performed by simple apparatus. The temperature for crosslinking by heating is not particularly limited so long as the dispersion state of the pigment is not broken, but is preferably not higher than 200° C., more preferably not higher than 180° C.

The concentrating step D is carried out depending on the pigment concentration and the ink characteristics. Moreover, the concentrating step may be carried out before the crosslinking step C. As a method for the concentration of the solvent, general atmospheric or vacuum distillation can be mentioned. For example, in the case of preparing an ink jet ink using a silicone solvent, as the organic solvent in which the silicone graft polymer is soluble, one which has a boiling point lower than that of the silicone solvent is used, and concentration is carried out by atmospheric or vacuum distillation. On the other hand, in the case of preparing an ink jet ink using the organic solvent in which the silicone graft polymer is soluble, a silicone solvent having a boiling point lower than that of the organic solvent in which the silicone graft polymer is soluble is used, and concentration is carried out by atmospheric or vacuum distillation.

Furthermore, a binder and/or an organic solvent is added to the ink for ink jet printers depending on uses to adjust the concentration of the particulate material or the binder to a given value.

As the binder, preferred are natural protein, celluloses, synthetic polymers such as polyvinyl alcohol, polyacrylamide, aromatic amides, polyacrylic acids, polyvinyl ether, polyvinyl pyrrolidone, acrylics, polyesters, alkyds, urethanes, amide resins, melamine resins, ether resins, fluorocarbon resins, styrene-acrylic resins, and styrene-maleic acid resins, photo-sensitive resins, thermosetting resins, ultraviolet-curing resins or electron ray-curing resins.

If necessary, anti-skinning agents, leveling agents, electric charge adjusting agents such as metallic soaps and lecithin, wetting agents, preservatives, deodorants, perfumes, pigment dispersing agents, pigment derivatives, and the like can further be added to the ink for ink jet printers according to the present invention.

For adding the above binders, organic solvents and various additives to the ink for ink jet printers according to the present invention, simple stirrers such as disper may be used, and dispersing machines which have hitherto been needed are not required, and, thus, energy saving can be attained and production at low cost becomes possible.

Printers to which the ink for ink jet printers of the present invention is applied are ink jet printers provided with a recording head having a plurality of ink discharging ports an energy transforming means for transforming electric energy to ink discharging energy in correspondence to the plurality of discharging ports. Examples thereof are those of generally known piezo-type and thermal type such as bubble jet printers. Especially preferred are printers of piezo-type, considering safety against the use of organic solvents.

DESCRIPTION OF PREFERRED EMBODIMENTS

The present invention will be explained in more detail by the following examples and comparative examples. In the following disclosure, "part" and "%" mean "part by weight" and "% by weight", respectively, unless otherwise notified. Furthermore, unless there are any notes, the reagents used are first class grade chemicals manufactured by Wako Junyaku Co., Ltd.

PREPARATION EXAMPLE 1

Preparation of Silicone Graft Polymer

| | |
|---|---|
| n-Butyl methacrylate | 16.1 parts |
| Lauryl methacrylate | 10.0 parts |
| Styrene | 35.0 parts |
| Methacrylic acid | 6.9 parts |
| Glycidyl methacrylate | 12.0 parts |
| X-22-174DX (manufactured by Shin-Etsu Chemical Co., Ltd.) | 20.0 parts |
| Perbutyl O (peroxy ester manufactured by Nippon Oil & Fats Co., Ltd.) | 8.0 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to 75° C. under sealing with nitrogen. The above solution was added thereto dropwise over 4 hours, and after completion of the addition, reaction was carried out for 6 hours at 75° C. The solution after completion of the reaction was a silicone graft polymer having a nonvolatile matter of 46.1%, an acid value of 44.0 KOH mg/g and a number-average molecular weight of 11800.

One part of this high molecular compound was diluted with a dimethylsiloxane solvent KF-96L-1.0 (manufactured by Shin-Etsu Chemical Co., Ltd.). When 0.5 part of the dimethylsiloxane solvent was added, self-dispersion occurred to produce a dispersion having an average particle diameter of 0.045 μm (measured by a Laser Doppler type particle size distribution meter N4 PLUS manufactured by Kohlter Co., Ltd.).

Moreover, 1 part of the above high molecular compound was diluted with an aliphatic hydrocarbon solvent Isopar G (manufactured by Exone Chemical Co., Ltd.). When 1.0 part of Isopar G was added, self-dispersion occurred to produce a dispersion having an average particle diameter of 0.048 μm (measured by a Laser Doppler type particle size distribution meter N4 PLUS manufactured by Kohlter Co., Ltd.).

PREPARATION EXAMPLE 2

Preparation of Silicone Graft Polymer

| | |
|---|---|
| n-Butyl methacrylate | 21.0 parts |
| Styrene | 25.0 parts |
| 2-Hydroxyethyl methacrylate | 15.0 parts |
| Lauryl methacrylate | 10.0 parts |
| X-22-174DX (manufactured by Shin-Etsu Chemical Co., Ltd.) | 20.0 parts |
| Glycidyl methacrylate | 12.0 parts |
| Butyl O (peroxy ester manufactured by Nippon Oil & Fats Co., Ltd.) | 8.0 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to the boiling point under sealing with nitrogen. The above solution was added thereto dropwise over 4 hours, and after completion of the addition, reaction was carried out for 6 hours under reflux. The solution after completion of the reaction was a high molecular compound having a nonvolatile matter of 45.6%, a hydroxyl value of 64.0 KOH mg/g and a number-average molecular weight of 10400.

One part of this high molecular compound was diluted with a dimethylsiloxane solvent KF-96L-1.0 (manufactured by Shin-Etsu Chemical Co., Ltd.). When 0.5 part of the dimethylsiloxane solvent was added, self-dispersion occurred to result in a dispersion having an average particle diameter of 0.105 nm (measured by a Laser Doppler type particle size distribution meter N4 PLUS manufactured by Kohlter Co., Ltd.).

PREPARATION EXAMPLE 3

Preparation of Silicone Graft Polymer

| | |
|---|---|
| n-Butyl methacrylate | 28.1 parts |
| Lauryl methacrylate | 10.0 parts |
| Styrene | 35.0 parts |
| Methacrylic acid | 6.9 parts |
| X-22-174DX (manufactured by Shin-Etsu Chemical Co., Ltd.) | 20.0 parts |
| Perbutyl O (peroxy ester manufactured by Nippon Oil & Fats Co., Ltd.) | 8.0 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to the boiling point under sealing with nitrogen. The above solution was added thereto dropwise over 2 hours, and after completion of the addition, reaction was carried out for 14 hours under reflux. The solution after completion of the reaction was a silicone graft polymer having a nonvolatile matter of 47.0%, an acid value of 44.5 KOH mg/g and a number-average molecular weight of 9900.

One part of this high molecular compound was diluted with a dimethylsiloxane solvent KF-96L-1.0 (manufactured by Shin-Etsu Chemical Co., Ltd.). When 0.3 part of the dimethylsiloxane solvent was added, self-dispersion occurred to produce a dispersion having an average particle diameter of 0.119 μm (measured by a Laser Doppler type particle size distribution meter N4 PLUS manufactured by Kohlter Co., Ltd.).

PREPARATION EXAMPLE 4

Preparation of Silicone Graft Polymer

| | |
|---|---|
| n-Butyl methacrylate | 26.8 parts |
| Styrene | 30.0 parts |
| 2-Hydroxyethyl methacrylate | 10.5 parts |
| 4-Vinylpyridine | 12.7 parts |
| X-22-174DX (manufactured by Shiri-Etsu Chemical Co., Ltd.) | 20.0 parts |
| Perbutyl O (peroxy ester manufactured by Nippon Oil & Fats Co., Ltd.) | 8.0 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to the boiling point under sealing with nitrogen. The above solution was added thereto dropwise over 2 hours, and after completion of the addition, reaction was carried out for 14 hours under reflux. The solution after completion of the reaction was a high molecular compound having a nonvolatile matter of 48.6%, a hydroxyl value of 44.0 KOH mg/g, an amine value of 65.1 KOH mg/g and a number-average molecular weight of 8,700.

One part of this high molecular compound was diluted with a dimethylsiloxane solvent KF-96L-1.0 (manufactured by Shin-Etsu Chemical Co., Ltd.). When 0.3 part of the dimethylsiloxane solvent was added, self-dispersion occurred to produce a dispersion having an average particle diameter of 0.09 μm (measured by a Laser Doppler type particle size distribution meter N4 PLUS manufactured by Kohlter Co., Ltd.).

PREPARATION EXAMPLE 5

Preparation of Polymer

| | |
|---|---|
| n-Butyl methacrylate | 16.1 parts |
| Lauryl methacrylate | 30.0 parts |
| Styrene | 35.0 parts |
| Methacrylic acid | 6.9 parts |
| Glycidyl methacrylate | 12.0 parts |
| Perbutyl O (peroxy ester manufactured by Nippon Oil & Fats Co., Ltd.) | 8.0 parts |

The above components were mixed to prepare a solution.

Then, 100 parts of methyl ethyl ketone (first class grade chemical manufactured by Wako Junyaku Co., Ltd.) was weighed and charged in a reaction vessel equipped with a nitrogen introduction pipe and heated to the boiling point under sealing with nitrogen. The above solution was added thereto dropwise over 4 hours, and after completion of the addition, reaction was carried out for 6 hours under reflux. The solution after completion of the reaction was a high molecular compound having a nonvolatile matter of 47.3%, an acid value of 44.2 KOH mg/g and a number-average molecular weight of 9800.

One part of this high molecular compound was diluted with a dimethylsiloxane solvent KF-96L-1.0 (manufactured by Shin-Etsu Chemical Co., Ltd.). When 0.8 part of the dimethylsiloxane solvent was added, the mixture became cloudy and agglomerated to result in a dispersion having an average particle diameter of 1.25 μm (measured by a Laser Doppler type particle size distribution meter N4 PLUS manufactured by Kohlter Co., Ltd.).

Various properties of the products in Preparation Examples 1–5 are shown in Table 1.

TABLE 1

| | Non-volatile content | Number-average molecular weight | Acid value | Hy-droxyl value | Amine value | Self-dispersion particle diameter |
|---|---|---|---|---|---|---|
| Preparation Example 1 | 46.1% | 11800 | 44.4 | 0 | 0 | 0.045 μm |
| Preparation Example 2 | 45.6% | 10400 | 0 | 64.0 | 0 | 0.09 μm |
| Preparation Example 3 | 47.0% | 9900 | 44.5 | 0 | 0 | 0.119 μm |
| Preparation Example 4 | 48.6% | 8700 | 0 | 44.0 | 65.1 | 0.09 μm |
| Preparation Example 5 | 47.3% | 9800 | 44.2 | 0 | 0 | 1.25 μm |

EXAMPLE 1

| | |
|---|---|
| Silicone graft polymer of Preparation Example 1 | 130.0 parts |
| Fastgen Blue TGR (copper-phthalocyanine blue pigment manufactured by Dainippon Ink & Chemicals Inc.) as pigment | 57.0 parts |
| Solsperse 5000 as phthalocyanine pigment derivative | 3.0 parts |
| Methyl ethyl ketone | 37.0 parts |
| KF-96L-2 | 37.0 parts |
| Zirconia beads of 3 mmφ | 250 cc |

The above were charged in a Dynomill Model KDL provided with a glass container of 300 cc, cooled with water of 5° C., and dispersed for 2 hours at a number of revolutions of 1000 rpm to obtain a dispersion slurry.

Then the following were mixed to obtain a mixed solution.

| | |
|---|---|
| The resulting dispersion slurry | 13.2 parts |
| Methyl ethyl ketone | 30.9 parts |
| KF-96L-2 | 30.9 parts |

Then, 75 parts of KF-96L-2 as a silicone solvent was weighed and charged in an eggplant type flask of 300 cc, and stirred by a magnetic stirrer. Under stirring, said mixed solution was slowly added thereto dropwise to precipitate the silicone graft polymer on the surface of the particulate material.

Figure 2:
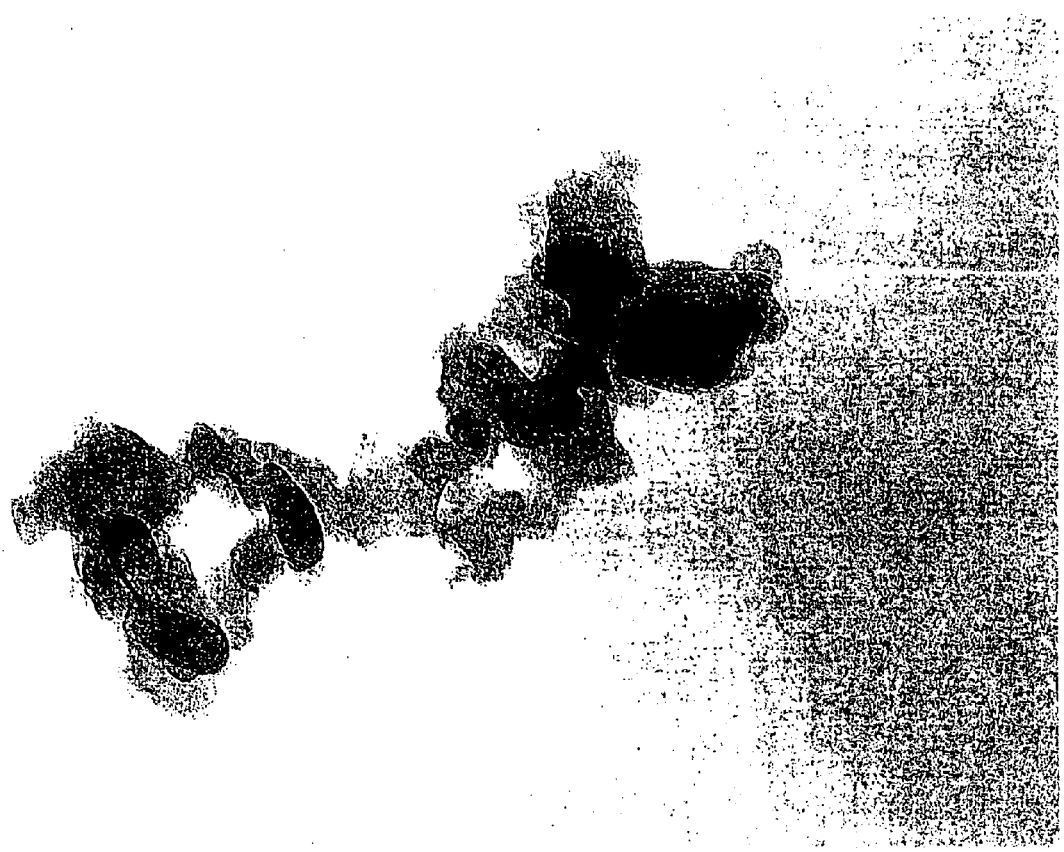
FIG. 2 is an electron microphotograph of the organic pigment after adsorption of the polymer contained in the dispersion composition in Example 1.

After completion of the addition, methyl ethyl ketone was removed by vacuum distillation, and furthermore a crosslinking reaction was carried out at 120° C. for 5 hours to obtain a dispersion composition having a pigment concentration of 4.75%. The resulting dispersion composition had a dispersion particle diameter of 0.125 μm (measured by a Laser Doppler type particle size distribution meter N4 PLUS manufactured by Kohlter Co., Ltd.). Moreover, this dispersion composition was adjusted to 5% in nonvolatile matter concentration using KF-96L-1 and subjected to centrifugal force of 33500 G for 5 hours, and the amount of the resin adsorbed due to the centrifugal sedimentation was measured from the nonvolatile content in the supernatant liquid. As a result, it was found that 80.5 parts of the silicone graft polymer was adsorbed to 100 parts of the particulate material. Furthermore, transmission electron microphotographs of the organic pigment in the dispersion composition before and after adsorption of the polymer are shown in FIG. 1 and FIG. 2, respectively. As shown in FIG. 2, it was confirmed that the polymer was clearly adsorbed to the surface of the organic pigment which was not seen in the case of the organic pigment alone of FIG. 1.

Furthermore, KF-96L-2 was added to 10 parts of KF-96-10 and the above dispersion composition in an amount of 3 parts in terms of the pigment (63.1 parts) to make up 100 parts in total, followed by filtration with a filter of 1 μm in bore diameter to prepare an ink for oil ink jet printers having a pigment concentration of 3%.

As shown in the following Table 3, this ink was small in particle diameter and low in viscosity, and showed no change and no sedimentation after subjected to the storage test. Furthermore, this ink showed extremely excellent characteristics such as printing stability and re-dischargeability in the printing test.

COMPARATIVE EXAMPLE 1

| | |
|---|---|
| Fastgen Blue TGR (copper-phthalocyanime blue pigment manufactured by Dainippon Ink & Chemicals Inc.) as pigment | 3.0 parts |
| MGS-F75 (nonionic surface active agent manufactured by Nikko Chemicals Co., Ltd.) | 0.5 part |
| Tamanol 135 (rosin resin manufactured by Arakawa Chemical Co., Ltd.) | 3.0 parts |
| Technocare FRV (silicone oil manufactured by Toshiba Silicone Co., Ltd.) | 29.5 parts |
| Technocare FRV (silicone oil manufactured by Toshiba Silicone Co., Ltd.) | 5.0 parts |
| KF-96L-2 (dimethylsiloxane manufactured by Shin-Etsu Chemical Co., Ltd.) | 37.0 parts |
| Oleyl alcohol | 22.0 parts |
| Zirconia beads of 3 mmφ | 300 parts |

The above were weighed and charged in a plastic bottle of 500 cc and dispersed for 2 hours by a paint shaker (manufactured by Eishin Co., Ltd.) to prepare an oil ink jet ink.

As shown in the following Table 3, this ink was somewhat larger in particle diameter and higher in viscosity than those of the ink of Example 1, and particle diameter and viscosity increased and sedimentation occurred after subjected to the storage test. This ink was inferior in printing stability and re-dispersibility.

EXAMPLE 2

A dispersion composition as shown in the following Table 2 was prepared in the same manner as in Example 1, except that Cinquasia Magenta RT-355-D (manufactured by Ciba Speciality Chemical Co., Ltd.) was used in place of Fastogen Blue TGR pigment and Solsperse 5000 used in Example 1.

Furthermore, an ink for oil ink jet printers having a pigment concentration of 3% was prepared in the same manner as in Example 1. As shown in Table 3, this ink was small in particle diameter and low in viscosity, and showed no change and no sedimentation after subjected to the storage test. Furthermore, this ink showed extremely excellent characteristics such as printing stability and re-dischargeability in the printing test.

COMPARATIVE EXAMPLE 2

A dispersion composition as shown in the following Table 2 was prepared in the same manner as in Example 1, except that 126.8 parts of the polymer of Preparation Example 5 and 3.2 parts of methyl ethyl ketone were used in place of 130.0 parts of the silicone graft polymer of Preparation Example 1 used in Example 2.

Furthermore, an ink for oil ink jet printers having a pigment concentration of 3% was prepared in the same manner as in Example 2. As shown in the following Table 3, this ink was larger in particle diameter than in Example 2, and showed sedimentation after subjected to the storage test. Furthermore, this ink caused failure in discharging in the printing test and was inferior in printing stability and re-dischargeability.

EXAMPLE 3

A dispersion composition as shown in the following Table 2 was prepared in the same manner as in Example 1, except that Yellow HG (manufactured by Clariant Co., Ltd.) was used in place of Fastogen Blue TGR pigment and Solsperse 5000 used in Example 1.

Furthermore, an ink for oil ink jet printers having a pigment concentration of 3% was prepared in the same manner as in Example 1. As shown in the following Table 3, this ink was small in particle diameter and low in viscosity, and showed no change and no sedimentation after subjected to the storage test. Furthermore, this ink showed extremely excellent characteristics such as printing stability and re-dischargeability in the printing test.

EXAMPLE 4

A dispersion composition as shown in the following Table 2 was prepared in the same manner as in Example 1, except that Printex 85 (carbon black pigment manufactured by Degussa Co., Ltd.) was used in place of Fastogen Blue TGR pigment used in Example 1.

Furthermore, an ink for oil ink jet printers having a pigment concentration of 3% was prepared in the same manner as in Example 1. As shown in the following Table 3, this ink was small in particle diameter and low in viscosity, and showed no change and no sedimentation after subjected to the storage test. Furthermore, this ink showed extremely excellent characteristics such as printing stability and re-dischargeability in the printing test.

COMPARATIVE EXAMPLE 3

| | |
|---|---|
| Printex 85 (carbon black pigment manufactured by Degussa Co., Ltd.) as pigment | 10.0 parts |
| Nonion OP80R (nonionic surface active agent manufactured by Nippon Oil & Fats Co., Ltd.) | 2.5 parts |
| Tamanol 510 (phenolic resin manufactured by Arakawa Chemical Co., Ltd.) | 15.0 parts |
| Isopar L oleyl alcohol | 75.0 parts |
| Zirconia beads of 3 mmφ | 300 parts |

The above were weighed and charged in a plastic bottle of 500 cc and dispersed for 2 hours by a paint shaker (manufactured by Eishin Co., Ltd.) to prepare an oil ink jet ink.

As shown in the following Table 3, this ink was larger in particle diameter and higher in viscosity than in the above Examples, showed sedimentation, and was inferior in printing stability.

EXAMPLE 5

A dispersion composition as shown in the following Table 2 was prepared in the same manner as in Example 1, except that 131.6 parts of the polymer of Preparation Example 2 and 35.4 parts of methyl ethyl ketone were used in place of 130.0 parts of the silicone graft polymer of Preparation Example 1 and 37 parts of methyl ethyl ketone used in Example 1.

Furthermore, an ink for oil ink jet printers having a pigment concentration of 10% was prepared in the same manner as in Example 1. As shown in the following Table 3, this ink was small in particle diameter and low in viscosity, and showed no change and no sedimentation after subjected to the storage test. Furthermore, this ink showed extremely excellent characteristics such as printing stability and re-dischargeability in the printing test.

EXAMPLE 6

Silicone Graft Polymer of Preparation

| | |
|---|---|
| Example 3 | 127.7 parts |
| Fastgen Blue TGR (copper-phthalocyanine blue pigment manufactured by Dainippon Ink & Chemicals Inc.) as pigment | 57.0 parts |
| Solsperse 5000 as phthalocyanine pigment derivative | 3.0 parts |
| Methyl ethyl ketone | 39.3 parts |
| KF-96L-2 | 37.0 parts |
| Zirconia beads of 3 mmφ | 250 cc |

The above were charged in a Dynomill Model KDL provided with a glass container of 300 cc, cooled with water of 5° C., and dispersed for 2 hours at a number of revolutions of 1000 rpm to obtain a dispersion slurry.

Then, the following were mixed to obtain a mixed solution.

| | |
|---|---|
| The resulting dispersion slurry | 13.2 parts |
| Methyl ethyl ketone | 30.9 parts |
| KF-96L-2 | 30.9 parts |

Then, 75 parts of KF-96L-2 as a silicone solvent was weighed and charged in an eggplant type flask of 300 cc, and stirred by a magnetic stirrer. Under stirring, the above mixed solution was slowly added thereto dropwise to precipitate the silicone graft polymer on the surface of the particulate material.

After completion of the addition, methyl ethyl ketone was removed by vacuum distillation to obtain a dispersion composition having a pigment concentration of 4.85%. The resulting dispersion composition had a dispersion particle diameter of 0.174 μm (measured by a Laser Doppler type particle size distribution meter N4 PLUS manufactured by Kohlter Co., Ltd.). Moreover, nonvolatile matter concentration of this dispersion composition was adjusted to 5% using KF-96L-1 and this dispersion composition was subjected to centrifugal force of 33500 G for 5 hours, and the amount of the resin adsorbed due to the centrifugal sedimentation was measured from the nonvolatile content in the supernatant liquid. As a result, it was found that 83 parts of the silicone graft polymer was adsorbed to 100 parts of the particulate material.

Furthermore, KF-96L-2 was added to 10 parts of KF-96-10 and the above dispersion composition in an amount of 3 parts in terms of the pigment (61.9 parts) to make up 100 parts in total, followed by filtration with a filter of 1 μm in bore diameter to prepare an ink for oil ink jet printers having a pigment concentration of 3%.

As shown in the following Table 3, this ink was small in particle diameter and low in viscosity, and showed no change and no sedimentation after subjected to the storage test. Furthermore, this ink showed extremely excellent characteristics such as printing stability and re-dischargeability in the printing test.

EXAMPLE 7

A dispersion composition as shown in the following Table 2 was prepared in the same manner as in Example 1, except that 123.5 parts of the polymer of Preparation Example 4 and 43.5 parts of methyl ethyl ketone were used in place of 127.7 parts of the silicone graft polymer of Preparation Example 2 and 39.3 parts of methyl ethyl ketone used in Example 5.

Furthermore, an ink for oil ink jet printers having a pigment concentration of 3% was prepared in the same manner as in Example 5. As shown in the following Table 3, this ink was small in particle diameter and low in viscosity, and showed no change and no sedimentation after subjected to the storage test. Furthermore, this ink showed extremely excellent characteristics such as printing stability and re-dischargeability in the printing test.

The pigment concentration here was measured by weighing about 2 g of the dispersion composition, charging it in an aluminum laboratory dish and drying for 60 minutes in an oven of 220° C.

The dispersion particle diameter in the following Table 2 is a dispersion average particle diameter measured by a Laser Doppler type particle size distribution meter N4 PLUS manufactured by Kohlter Co., Ltd. The adsorption amount is an amount of the resin adsorbed to the pigment (100) which was measured in the following manner. The nonvolatile matter concentration of the dispersion composition was adjusted to 5% using KF-96L-1 (manufactured by Shin-Etsu Chemical Co., Ltd.), this dispersion composition was subjected to centrifugal force of 33500 G for 5 hours, and the amount of the resin adsorbed due to the centrifugal sedimentation was measured from the nonvolatile content in the supernatant liquid.

TABLE 2

| | Pigment | Polymer | Solvent | Pigment concentration | Particle diameter | Adsorption amount |
|---|---|---|---|---|---|---|
| Example 1 | Blue TGR | Preparation Example 1 | KF-96L-2 | 4.75% | 0.125 μm | 81 |
| Comparative Example 1 | Blue TGR | Rosin | Silicone/ alcohol | 3.00% | 0.895 μm | 7 |
| Example 2 | Magenta RT-355-D | Preparation Example 1 | KF-96L-2 | 4.81% | 0.178 μm | 78 |
| Comparative Example 2 | Magenta RT-355-D | Preparation Example 5 | KF-96L-2 | 4.80% | 1.523 μm | 95 |
| Example 3 | Yellow HG | Preparation Example 1 | KF-96L-2 | 4.79% | 0.185 μm | 82 |
| Example 4 | Printex 85 | Preparation Example 1 | KF-96L-2 | 4.85% | 0.123 μm | 82 |
| Comparative Example 3 | Printex 85 | Phenol | Isopar-L | 10.00% | 0.789 μm | 5 |
| Example 5 | Blue TGR | Preparation Example 2 | KF-96L-2 | 4.79% | 0.115 μm | 90 |
| Example 6 | Blue TGR | Preparation Example 3 | KF-96L-2 | 4.85% | 0.174 μm | 85 |
| Example 7 | Blue TGR | Preparation Example 4 | KF-96L-2 | 4.79% | 0.125 μm | 83 |

Next, characteristics of the ink for oil ink jet printers were evaluated. Here, the particle diameter was measured by a Laser Doppler type particle size distribution meter N4 PLUS manufactured by Kohlter Co., Ltd. The viscosity was measured by an R-type viscometer manufactured by Toki Sangyo Co., Ltd. at a number of revolutions of 100 rpm. In case the viscosity could not be measured at 100 rpm, the measurement was carried out with reducing the number of revolutions. The storage test was conducted by weighing 40 g of the ink and put it in a glass container of 60 cc, closing the container and leaving it in a thermostatic chamber at 60° C. for 2 weeks. When no sediment was seen, this was shown by ○, and when sediment was seen, this was shown by X. The printing test was conducted in the following manner. The ink was filled in C-520 ink cartridge manufactured by Epson Co., Ltd. and printing was carried out on papers of A4 size by C-520 ink jet printer. The printing patterns of Denshi Kogyo Kyokai (Association of Electronics Industry) were continuously printed, and printing stability was evaluated, namely, when stable printing could be performed continuously on more than 1000 papers, this was shown by ○; when printing could be performed on more than 1000 papers though cleaning was necessary, this was shown by Δ; and when clogging occurred and printing could not be performed, this was shown by X. The re-dischargeability was evaluated in the following manner. The ink was set in a C-520 ink jet printer and left to stand for 1 month at room temperature, and, thereafter, the ink was again subjected to the printing test. When stable printing could be performed with cleaning of one or less time, this was shown by ○; when stable printing could be performed with cleaning of three or less times, this was shown by Δ; and when stable printing could not be performed, this was shown by X. The results are shown in Table 3.

TABLE 3

| | Properties of ink | | After storage test | | Printing test | | |
|---|---|---|---|---|---|---|---|
| | Particle diameter | Viscosity | Particle diameter | Viscosity | Sediment | Printing stability | Re-dischargeability |
| Example 1 | 0.123 | 2.8 | 0.122 | 2.8 | ○ | ○ | ○ |
| Comparative Example 1 | 0.903 | 3.8 | 1.324 | 4.2 | X | X | X |
| Example 2 | 0.175 | 2.9 | 0.177 | 2.8 | ○ | ○ | ○ |
| Comparative Example 2 | 1.451 | 3.1 | 1.415 | 3.5 | X | X | X |
| Example 3 | 0.182 | 2.7 | 0.181 | 2.7 | ○ | ○ | ○ |
| Example 4 | 0.117 | 2.7 | 0.116 | 2.7 | ○ | ○ | ○ |
| Comparative Example 3 | 0.789 | 12.5 | 1.155 | 13.8 | X | X | X |
| Example 5 | 0.113 | 2.9 | 0.111 | 2.9 | ○ | ○ | ○ |
| Example 6 | 0.173 | 2.9 | 0.179 | 2.8 | ○ | ○ | ○ |
| Example 7 | 0.122 | 2.7 | 0.125 | 2.7 | ○ | ○ | ○ |

As explained above, the ink for oil ink jet printers of the present invention was enhanced in dispersion stability such as storage stability or inhibition of sedimentation of pigment, and, further, improved in printing stability. Moreover, print quality such as water resistance or light resistance can be improved by using pigments and organic solvents. In addition, safety of the ink can be increased by using high-boiling silicone-based organic solvents which are high in safety.

What is claimed is:

1. An ink for ink jet printers which contains a pigment and an organic solvent where a silicone graft polymer is contained in the ink and is dispersed in the organic solvent in the form of particles having a particle diameter of 0.01–0.3 μm and in such a state that the silicone graft polymer is adsorbed by at least a portion of the outer surface of the pigment, wherein the organic solvent has a small polarity and an electrical resistivity of not lower than $10^9$ Ω·cm, the silicone graft polymer is adsorbed to the pigment in an amount of 5–3000 parts by weight based on 100 parts by weight of the pigment, and the silicone graft polymer is crosslinked with an ester lineage.

2. An ink for ink jet printers according to claim 1, wherein the pigment is selected from the group consisting of inorganic pigments, organic pigments and dyes insoluble in the solvent and the pigment has a particle diameter of 0.01–0.3 μm.

3. An ink for ink jet printers according to claim 1 or 2, wherein the pigment is an organic pigment and/or carbon black, and the silicone graft polymer is dispersed in the organic solvent in the form of particles having a particle diameter of 0.01–0.3 μm in such a state as the silicone graft polymer being adsorbed to at least a part of the outer surface of the organic pigment and/or carbon black.

4. An ink for ink jet printers according to claim 1, wherein the organic solvent comprises a methylpolysiloxane and/or cyclic methylpolysiloxane structure.

5. An ink for ink jet printers according to claim 1, wherein the silicone graft polymer has a polar group.

6. An ink for ink jet printers according to claim 5, wherein the polar group is selected from the group consisting of at least one carboxyl group, hydroxyl group and amino group.

7. An ink for ink jet printers according to claim 1, wherein the silicone graft polymer has a number-average molecular weight of 2000–50000.

8. An ink for ink jet printers according to claim 1, wherein the silicone graft polymer is obtained from an acrylic compound.

9. An ink for ink jet printers according to claim 1, wherein the graft portion of the silicone graft polymer has a molecular weight of 500–10000.

10. An ink for ink jet printers according to claim 1, wherein the silicone graft polymer has two or more functional groups for crosslinking which can crosslinking-react with an acidic group.

11. An ink for ink jet printers according to claim 10, wherein the functional group for crosslinking is a glycidyl group or a hydroxyl group.

12. An ink for ink jet printers according to claim 1 which is used for an ink jet printer provided with a recording head having a plurality of ink discharging ports, an energy transforming means for transforming electric energy to ink discharging energy in correspondence to the plurality of discharging ports.

13. An ink for ink jet printers according to claim 1 which contains at least one additional additives selected from the group consisting of binders, organic solvents, anionic, cationic and nonionic surface active agents, preservatives, deodorants, anti-skinning agents, perfumes, pigment dispersing agents, pigment derivatives, leveling agents, electric charge adjusting agents and wetting agents.

14. An ink for ink jet printers according to claim 1 which has a viscosity of 1–20 mP·s.

* * * * *